United States Patent [19]

Olson et al.

[11] Patent Number: 5,744,116
[45] Date of Patent: Apr. 28, 1998

[54] REACTION OF URANIUM FLUORIDES WITH MINERAL ACIDS TO RECOVER HYDROGEN FLUORIDE

[75] Inventors: Brian C. Olson, Cobourg; John H. Wang, Saskatoon, both of Canada; Dennis W. Prediger, Bassano, Italy; Marlo S. Savoie; Dennis G. Garratt, both of Cobourg, Canada

[73] Assignee: Cameco Corporation, Port Hope, Canada

[21] Appl. No.: 354,161

[22] Filed: Dec. 8, 1994

[51] Int. Cl.$^6$ ........................................... C01B 7/19
[52] U.S. Cl. .......................... 423/483; 423/258; 423/19
[58] Field of Search .................. 264/0.5; 423/258, 423/483, 19

[56] References Cited

U.S. PATENT DOCUMENTS

| | | |
|---|---|---|
| 2,711,361 | 6/1955 | Morris. |
| 2,733,127 | 1/1956 | Spiegler. |
| 3,235,327 | 2/1966 | Blundell et al. ............ 423/261 |
| 3,786,120 | 1/1974 | Hollander et al. .......... 252/636 |
| 3,790,493 | 2/1974 | Dada et al. ................. 423/261 |
| 3,796,672 | 3/1974 | Dada et al. ................. 252/636 |
| 3,845,193 | 10/1974 | Littlechild et al. ......... 423/261 |
| 3,906,081 | 9/1975 | Welty ........................ 423/261 |
| 3,928,538 | 12/1975 | Lillyman et al. ........... 423/260 |
| 3,970,581 | 7/1976 | Jeter et al. ................. 252/636 |
| 4,005,042 | 1/1977 | Dada ......................... 252/636 |
| 4,031,029 | 6/1977 | Colter et al. ............... 252/636 |
| 4,090,976 | 5/1978 | DeHollander et al. ...... 252/636 |
| 4,120,936 | 10/1978 | DeLuca et al. ............. 423/261 |
| 4,397,824 | 8/1983 | Butler et al. ............... 423/260 |
| 4,689,178 | 8/1987 | Gay et al. .................. 252/626 |
| 4,698,214 | 10/1987 | Linz et al. ................. 423/260 |
| 4,788,048 | 11/1988 | Tanaka et al. ............. 423/261 |
| 4,808,390 | 2/1989 | Tanaka et al. ............. 423/261 |
| 4,830,841 | 5/1989 | Urza .......................... 423/261 |
| 5,023,059 | 6/1991 | Bielecki et al. ............ 423/9 |
| 5,346,684 | 9/1994 | Mestepey ................... 423/488 |
| 5,385,713 | 1/1995 | Carlson ..................... 423/11 |

FOREIGN PATENT DOCUMENTS

| | | |
|---|---|---|
| 619775 | 5/1961 | Canada. |
| 2068068 | 3/1993 | Canada. |
| A 0322481 | 7/1989 | European Pat. Off.. |
| A 0529768 | 3/1993 | European Pat. Off.. |
| 3841210 A1 | 6/1990 | Germany. |
| 3841212 A1 | 6/1990 | Germany. |
| A 3841212 | 6/1990 | Germany. |
| 51-90854 | 7/1976 | Japan. |
| 772617 | 4/1957 | United Kingdom. |
| 782982 | 9/1957 | United Kingdom. |
| WO 90/09957 | 9/1990 | WIPO. |

OTHER PUBLICATIONS

Database WPI, Section Ch, Week 8803, Derwent Publications Ltd. London, GB; Class E31, AN 88–016997 & JP, A,62 278 128 (Mitsubishi Metal KK), 3 Dec. 1987.

Database WPI, Section Ch, Week 8624, Derwent Publications Ltd., London, GB; Class E37, AN 86–152930 & JP,A,61 086 402 (Doryokuro Kakunenryo Kai), 1 May 1986.

E. H. P. Cordfunke, "The System Uranyul Sulphate–Water–II", J. Inorg. Nucl. Chemistry, vol. 34, 1972, GB, pp. 1551–1561, XP 000563946.

P. Pascal, "Nouveau Traite de chimie Minerale", Tome XV, 1960, Masson et cie, Paris, France, pp. 170–171.

D. Davis, The Reaction Between Uranium Hexafluoride and Sulfuric Acid, A.E.R.E. Harwell, Feb. 1957.

E.H.P. Cordfunke, "The System Uranyl Sulphate–Water–I Preparation and Characterization Of The Phases In The System", J. Inorg. Nucl. Chem., 1969, vol. 31, pp. 1327 to 1335, Pergamon Press, Printed in Great Britain.

E.H. Cordfunke, "The System Uranyl Sulphate–Water–II Phase Relationships And Thermochemical Properties Of The Phases in The System $UO_3$–$SO_3$–$H_2O$", J. Inorg. Nucl. Chem., 1972, vol. 34, pp. 1551–1561, Pergamon Press.

W.W. Wilson et al., "Synthesis and Characterization of the Difluorotris (flurosulfate) of Uranium(V): $UF_2(SO_3F)_3$", Inorganic Chemistry, vol. 16, No. 9 (1977).

Masson et al., Synthesis and Characterization of Uranium(V) Fluoride Fluorosulfates and Uranium(V) Oxyfluorosulfate: $UF_3(SO_3F)_2$, $UF(SO_3F)_4$, and $UO(SO_3F)_3$, Inorg. Chem., vol. 17, No. 7, (1978).

Primary Examiner—Ngoclan Mai
Attorney, Agent, or Firm—Fish & Richardson P.C.

[57] ABSTRACT

Uranium fluoride compounds, in which the uranium is preferably present in the tetravalent or higher valency state, are reacted with a strong mineral acid, to yield a gaseous phase of hydrogen fluoride and a precipitate that is a uranium salt of the mineral acid. The precipitate can be subjected to thermal decomposition to recover the mineral acid and to obtain an oxide of uranium. The process provides an economical way of obtaining hydrogen fluoride from byproduct depleted $UF_6$.

36 Claims, No Drawings

REACTION OF URANIUM FLUORIDES WITH MINERAL ACIDS TO RECOVER HYDROGEN FLUORIDE

The present invention relates to a process for obtaining hydrogen fluoride from a uranium fluoride compound. In a preferred embodiment there is also obtained a uranium oxide or an environmentally stable uranium compound from the uranium fluoride compound.

BACKGROUND OF THE INVENTION

Hydrogen fluoride is obtained commercially from the mineral fluorspar, $CaF_2$, by treatment with sulphuric acid, as for example per U.S. Pat. Nos. 2,456,509, and 3,718,736. The rate of production and yields are influenced by the purity and the physical state of the fluorspar, the concentration of the $H_2SO_4$, the ratio of acid to fluorspar, the temperature of the reaction mixture and the manner of contact. The mineral fluorspar is not a pure chemical compound, so the hydrogen fluoride prepared in this manner contains impurities that depend upon the impurities present in the fluorspar and as such requires further processing as, for example, by technologies defined by U.S. Pat. Nos. 4,032,621, 4,756,899, 4,929,435, and 4,954,330. Carbonates in the fluorspar, for example, are a problem because they consume $H_2SO_4$ and form $CO_2$ which is a noncondensable contaminant of the hydrogen fluoride. Other impurities such as sulphur and arsenic further contaminate the product, and add to corrosion problems. The reaction of fluorspar with $H_2SO_4$ is endothermic and thus energy in the form of heat must be applied.

A major use of hydrogen fluoride since 1942 has been in the synthesis of uranium fluorides, in particular $UF_4$ and $UF_6$, for use in the nuclear industry. Uranium and its compounds are used as fuel in nuclear reactors. For some reactors the fuel must be enriched in the isotope $^{235}U$. The manner in which the uranium isotopic composition is changed or enriched in industry is currently to convert natural uranium compounds to $UF_6$ and to subject the chemically pure $UF_6$ to an isotope separation process, such as gaseous diffusion, gaseous centrifugation, or laser isotope separation technology.

A product of this isotopic separation process is a stream of $UF_6$ that is enriched in the $^{235}U$ isotope. This enriched $UF_6$ is converted by multi-stage processes to ceramic grade $UO_2$ which is used in the preparation of nuclear fuel. A byproduct of this process is a stream of $UF_6$ that is depleted in the $^{235}U$ isotope and is therefore of no use currently as a nuclear fuel. There are no significant commercial uses for $UF_6$ containing depleted uranium. At present, the majority of this material is simply stored, at some risk due to the potential for a catastrophic release of hydrogen fluoride due to hydrolysis of $UF_6$ if a storage cylinder is breached. For example, approximately 560,000 metric tons of depleted $UF_6$ is in storage at three sites in the United States, alone! Excluding the value of the uranium as nuclear fuel, the major economic potential of uranium fluorides lies in their fluorine content. Since uranium fluorides are not used directly as fuel, methodologies to recover the fluorine values in a useful form are of importance, irrespective of the final use of the uranium.

DISCUSSION OF THE PRIOR ART

There have been a number of technologies developed to convert $UF_6$ and related uranium fluorides, such as $UF_4$ and $UO_2F_2$, to oxides, such as $U_3O_8$ and $UO_2$. Examples of these are to be found in Canadian Patents number 604,870, 672,052, 754,461, 754,462, 763,872, 904,540, 926,583, 1,124,033, and 2,031,333. U.S. Pat. Nos. 3,192,010, 3,786,120, 3,790,493, 3,796,672, 3,808,145, 3,819,804, 3,842,155, 3,871,829, 3,937,784, 3,969,477, 3,970,581, 3,978,194, 4,005,042, 4,020,146, 4,031,029, 4,053,559, 4,090,976, 4,112,055, 4,374,807, 4,666,691, and 4,873,031, 4,963,294, and German Patent number 3,619,391. A standard technology has been to vapourize the $UF_6$ and hydrolyze it with $H_2O$ vapour or liquid water, as per:

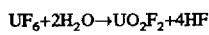
$$UF_6 + 2H_2O \rightarrow UO_2F_2 + 4HF$$

The resultant solution of $UO_2F_2$ is precipitated with ammonia, as per:

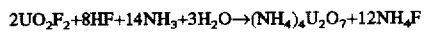
$$2UO_2F_2 + 8HF + 14NH_3 + 3H_2O \rightarrow (NH_4)_4U_2O_7 + 12NH_4F$$

The ammonium diuranate, $(NH_4)_4U_2O_7$, is purified and dried, then converted to $U_3O_8$ by reduction in an $H_2O$—$H_2$ mixture in the range 400° to 750° C. and then reduced to $UO_2$ in $H_2$ at temperatures in the range 550° C. to 1900° C. The wide temperature ranges noted herein reflect the different specifications noted in the aforementioned patents.

An alternative process is based on the reaction of $UF_6$ with $NH_3$ and $CO_2$, as per the following:

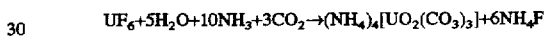
$$UF_6 + 5H_2O + 10NH_3 + 3CO_2 \rightarrow (NH_4)_4[UO_2(CO_3)_3] + 6NH_4F$$

In the first stage $UF_6$ vapour is reacted with $H_2O$, forming $UO_2F_2$ as an intermediate which reacts with the aforementioned $NH_3$ and $CO_2$. The resultant ammonium uranyl carbonate complex is subsequently calcined at temperatures in excess of 650° C., in either an oxidative or reductive environment, to produce either $U_3O_8$ or $UO_2$ respectively. In neither of these cases are the fluorine values recovered in a valuable form. At best two thirds of the fluorine values might be recovered as aqueous HF with the remainder as ammonium fluoride, for which there are currently no significant commercial uses.

A further alternative technology involves the reduction of $UF_6$ with hydrogen to obtain $UF_4$ and HF, followed by pyrohydrolysis of $UF_4$ to $UO_2$ by steam, in accordance with the following equations:

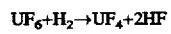
$$UF_6 + H_2 \rightarrow UF_4 + 2HF$$

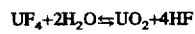
$$UF_4 + 2H_2O \rightleftharpoons UO_2 + 4HF$$

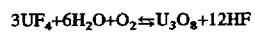
$$3UF_4 + 6H_2O + O_2 \rightleftharpoons U_3O_8 + 12HF$$

The first reaction is exothermic and becomes self-sustaining at approximately 425° C. The reactor is maintained at approximately 650° C. by cooling. In the second and third reactions the $UF_4$ can be converted with steam and air at approximately 700° C. by pyrohydrolysis to either $UO_2$ or $U_3O_8$ and HF. All three reactions require high temperatures, which creates a very corrosive environment. Theoretically, this process should yield anhydrous hydrogen fluoride. In practice, due to design limitations and steam requirements in excess of stoichiometric amounts, an aqueous HF is produced which requires further upgrading to the commercially preferred anhydrous form.

Canadian Patent Application number 2,068,068, which corresponds to European Patent Application number 529,768, discloses a multi-stage process for recovering hydrogen fluoride from $UF_6$. In a first stage $UF_6$ is reacted with steam, resulting in the formation of $UO_2F_2$ and a gaseous mixture of hydrogen fluoride and water. The $UO_2F_2$ is fed to a second reactor where it is reacted with water with formation of $U_3O_8$ and a gaseous mixture of water, hydrogen fluoride and oxygen. The two mixtures of hydrogen fluoride and water are then combined and subjected to distillation to recover an anhydrous mixture of oxygen and hydrogen fluoride and a hydrogen fluoride/water azeotrope. The anhydrous mixture of oxygen and hydrogen fluoride is fed to a condenser where the two components are then separated into a liquid anhydrous hydrogen fluoride product and gaseous oxygen.

German Patent Applications numbers 3,841,210 and 3,841,212 disclose processes for producing silicon tetrafluoride and germanium tetrafluoride, respectively, for use in semiconductors and solar cell applications. Silicon dioxide or germanium dioxide is reacted with depleted uranium hexafluoride, in the presence of a strong mineral acid, to produce the required silicon tetrafluoride or germanium tetrafluoride.

Particular mention is made of sulphuric acid, as the strong mineral acid, with reference to the essentially inert uranyl sulphate byproduct being easily stored.

SUMMARY OF THE INVENTION

The present invention provides a process for producing hydrogen fluoride, which process comprises reacting a uranium fluoride compound, preferably $UF_6$, with a strong mineral acid, such as sulphuric acid, oleum, fluorosulphuric acid, ortho-phosphoric acid, fluorophosphoric acid, or difluorophosphoric acid, but preferably sulphuric acid, and recovering from the reaction mixture gaseous hydrogen fluoride and a uranium salt of the strong mineral acid. The uranium salt can be recovered and thermally decomposed in an oxidative or reductive environment to form a uranium compound suitable for use as a component of nuclear fuel or for disposal. The reaction mixture from which the salt has been recovered can be recycled to the process for reaction with a further quantity of uranium fluoride. If the mineral acid is sulphuric, oleum or fluorosulphuric acid there is obtained a uranium salt that can be decomposed with recovery of the acid values, which can be recycled.

DESCRIPTION OF THE PREFERRED EMBODIMENTS

As strong mineral acids for use in the process there are mentioned sulphuric acid, oleum, fluorosulphonic acid (sometimes referred to in the literature as fluorosulphuric acid), orthophosphoric acid, fluorophosphoric acid, difluorophosphoric acid, hydrochloric acid and nitric acid.

If the strong acid is sulphuric acid, oleum or fluorosulphuric acid it is possible to obtain the hydrogen fluoride in anhydrous form. The obtained uranium salt is in the form of a precipitated solid or oily, viscous liquid that is readily separated from the other components of the reaction mixture. The salt can then be dried and calcined and, depending upon whether the calcining is carried out under oxidizing or reducing conditions, there is obtained $U_3O_8$ or $UO_2$.

If uranium is to be stored it is preferred to store it in the form of the oxide $U_3O_8$, which is thermodynamically highly stable and very insoluble in natural aquatic systems. If the uranium is to be used as a nuclear fuel it is used in the form of $UO_2$. It is possible to recover from the uranium salt substantially all the $SO_3$ which can be converted back to sulphuric acid to be recycled to the process. If the strong mineral acid is sulphuric acid, therefore, it is possible to convert a uranium fluoride compound into commercially valuable anhydrous hydrogen fluoride (AHF) and either $U_3O_8$ or $UO_2$, with no net consumption of sulphuric acid (apart from small make-up quantities) and production of no by-products. The process is therefore environmentally benign. This is particularly the case when the process is used to destroy stored $UF_6$.

If phosphoric acid or fluorophosphoric or difluorophosphoric acid is used as the strong mineral acid it is possible to obtain anhydrous hydrogen fluoride and a precipitate of a uranium phosphate. This compound is stable, and so is not readily convertible to $U_3O_8$ or $UO_2$, but it can be stored.

If hydrochloric acid or nitric acid is used the hydrogen fluoride is obtained in aqueous, not anhydrous form and the uranium salt is in solution. For these reasons use of hydrochloric acid or nitric acid is not preferred. An aqueous mixture of hydrogen fluoride and hydrochloric or nitric acid is of value for pickling in the steel industry, however.

The reaction with strong mineral acid will proceed with any uranium fluoride but the uranium fluorides that are readily available are all compounds in which the uranium is present in the tetravalent or higher valency state. It is therefore preferred to use a uranium compound in the tetravalent or higher valency state. Use of $UF_6$ is particularly preferred.

It is preferred to obtain the hydrogen fluoride in anhydrous form, as AHF is a valuable item of commerce. In this specification hydrogen fluoride that has a water content less than 500 ppm is considered to be anhydrous. Preferably it has a water content less than 250 ppm. Applicant has obtained water contents below 100 ppm. It is important to note that the hydrogen fluoride obtained is found to be completely free of contamination from any uranium-containing species. It can therefore be used outside the nuclear industry without further processing.

The reaction between the uranium fluoride compound and the mineral acid proceeds at moderate temperatures, so that a highly corrosive, highly elevated temperature environment is not required. Depending upon the uranium fluoride compound, the reaction proceeds fairly quickly at ambient temperatures, although the use of elevated temperature or subambient temperatures is not outside the scope of the invention and in some cases may be either necessary or desired. The optimum temperature depends to some extent on the particular uranium fluoride compound being used. The reaction is normally carried out with the mineral acid in the liquid phase and at atmospheric pressure, so the temperature is normally not greater than 200° C. With uranium hexafluoride, $UF_6$, and 50 to 100 wt % sulphuric acid, oleum, fluorosulphuric acid or 50 to 85 wt % phosphoric acid the reaction proceeds swiftly at ambient temperature, and even at a moderate rate in the condensed phase at temperatures approaching −100° C. It is contemplated that the process will be operated at a temperature in the range −20° to 200° C., however. A preferred temperature is in the range 80° C. to 100° C., in order to maximize the recovery of anhydrous hydrogen fluoride. With uranium tetrafluoride no reaction occurs at a reasonable rate with either sulphuric or phosphoric acids at ambient temperature, so heat is required and it is preferred to carry out the reaction at a temperature higher than about 75° C., more preferably about 80° to 100° C., with 50 to 100 wt % sulphuric acid or 50 to 85 wt % phosphoric acid. With uranyl fluoride, $UO_2F_2$, and 50 to 100 wt % sulphuric acid, oleum or fluorosulphuric acid or 50 to 85 wt % phosphoric acid, ambient or subambient temperature is satisfactory, with the preferred temperature range being 80° C. to 100° C. to maximize recovery of anhydrous hydrogen fluoride.

The reaction can be carried out at reduced pressure or at elevated pressure, say between about 0.005 atmospheres and 4 atmospheres, but atmospheric pressure is preferred.

Although the uranium compound can be any uranium compound that also contains fluorine it is preferably a compound in which the uranium is in the tetravalent or higher valency state. The compound can also contain other elements, for example oxygen, sulphur or hydrogen. Mention is made of $UF_6$, $UOF_4$, $USF_4$, $UH_2F_4$, $US_2F_2$, $UO_2F_2$, $UF_4$, $U_2F_9$, $U_4F_{17}$, $UF_5$, and the like. In a preferred embodiment of the invention the uranium compound may be either depleted or enriched $UF_6$ both of which are products of the isotope enrichment process, or $UF_6$ of natural isotopic composition. These nuclear grade materials are of very high purity, and consequently hydrogen fluoride of very high purity is obtained.

Any strong mineral acid can be used in the process of the invention, and mention is made of sulphuric, fluorosulphuric, oleum, phosphoric acids, fluorophosphoric, difluorophosphoric, nitric, and hydrochloric. Of these, sulphuric acid, oleum, fluorosulphuric acid, phosphoric acid, fluorophosphoric acid, and difluorophosphoric acid are preferred when anhydrous hydrogen fluoride is desired. The least expensive mineral acid is usually sulphuric acid. Furthermore, it is believed that other acids offer no commercial or technological advantage over sulphuric acid, although oleum or phosphoric acid might be substituted in some circumstances. It is therefore preferred to use sulphuric acid and the invention is further described with primary reference to sulphuric acid, $H_2SO_4$ and oleum, and with only secondary reference to the use of ortho-phosphoric acid, $H_3PO_4$.

In a preferred embodiment of the invention the process may be described in terms of a primary reaction between $UF_6$ and $H_2SO_4$ to yield hydrogen fluoride and a uranyl sulphate-bisulphate complex. The latter complex, which is recovered as an insoluble oil or as a precipitate of an amorphous or crystalline solid, is subsequently dried to remove entrained hydrogen fluoride and water of hydration, and can then be thermally decomposed in an oxygen-rich environment to yield $U_3O_8$ and $SO_3$. The oxygen-rich environment can be provided by any atmosphere containing molecular oxygen, and is most conveniently provided by air. Pure oxygen can be used, however, and may assist in acid recovery. Due to the temperature requirements of the thermal decomposition, the $SO_3$ is in equilibrium with $SO_2$ and $O_2$. The technology for the reaction of $SO_2$ and $O_2$ to form $SO_3$ is well known, as is the reaction of $SO_3$ with $H_2O$, so it is possible to recover the sulphuric acid values. This latter reaction is of importance to this process as $H_2SO_4$ can be recovered and recycled to the primary reactor.

The drying and thermal decomposition of the uranyl sulphate-bisulphate complex, $2UO_2(HSO_4)_2 \bullet UO_2SO_4 \bullet 8H_2O$, follows the behaviour previously described by Cordfunke (*J. Inorg. Nucl. Chem.* 31, 1327–1335, 1969 & 34, 1551–1561, 1972) for synthetic samples of uranyl sulphate hydrates prepared from uranium trioxide and sulphuric acid. Loss of water and entrained HF occurs up to about 250° C. at which point there is left anhydrous $UO_2SO_4$ plus residual sulphuric acid, the quantity of residual acid being a function of the efficiency of the solid-liquid or liquid-liquid separation stage prior to drying. The major transition points for water loss occur at about 110° C. and 190° C. A phase transition occurs between $\alpha$-$UO_2SO_4$ and $\beta$-$UO_2SO_4$ at about 325° C. Thermal decomposition of $UO_2SO_4$ to $U_3O_8$ starts between 620° C. and 725° C., and is complete for practical purposes between about 760° C. and 860° C. The ranges in temperature reflect the impact of residual $H_2SO_4$ entrained with the $UO_2SO_4$ and the different thermal behaviour of the sulphate and bisulphate species. The decomposition reaction can be carried out any temperature above 620° C. and the higher the temperature the faster the decomposition reaction.

If a reductive environment is used, instead of an oxygen-rich environment, during the thermal decomposition of the uranyl sulphate-bisulphate complex there is obtained $UO_2$ which may be fabricated into fuel elements for nuclear reactors. A preferred reducing agent is hydrogen, which is normally admixed with an inert gas, for example nitrogen or argon. Although the reduction could be carried out in 100% hydrogen, this is highly undesirable from the point of view of safety; 100% hydrogen at the temperature required for decomposition would present a considerable hazard. It is preferred to use a mixture of from 5 mol % to 75 mol % hydrogen in the inert gas. There can be used dissociated amonium, a mixture of 75 mol % hydrogen and 25 mol % nitrogen. The hydrogen content of the mixture is not critical, provided that there is present sufficient hydrogen to create the required reducing atmosphere. Thus, depending on the isotopic composition of the $UF_6$, this process may be used either to convert depleted $UF_6$ into $U_3O_8$ for safe storage and/or disposal, or to convert $UF_6$ of any isotopic composition into $UO_2$ for use as fuel in nuclear reactors, or for whatever other technological uses may be envisioned.

Although 100% sulphuric acid or oleum, i.e. sulphuric acid containing excess $SO_3$ can be used, sulphuric acid is usually used in aqueous solution, with a concentration of $H_2SO_4$ of at least 50 wt %, more preferably at least about 60 wt %. A particularly preferred concentration range is about 75 to 85 wt %. It is preferred to use the sulphuric acid in large molar excess, say five-fold or ten-fold excess. Although the reaction will proceed if the sulphuric acid and uranium fluoride compound are present in stoichiometrically equivalent amounts, the use of excess sulphuric acid avoids potential process control problems due to formation of undesired intermediate compounds. As the excess sulphuric acid is recovered and recycled there is no disadvantage to the use of a large excess of sulphuric acid.

If oleum is used the excess $SO_3$ can be up to about 50% but it is preferred to use oleum with a 20% excees of $SO_3$.

There is no criticality in the manner of reacting the uranium compound with the strong mineral acid; they can be brought into contact in any convenient manner. It is, for example, possible to bubble $UF_6$ gas through a solution of the mineral acid. Alternatively, it is possible to mix streams of the reactants in a Venturi reactor. The reaction can be carried out in a tank equipped with agitator and draw-off points for hydrogen fluoride and for the uranium salt.

After separation and prior to any calcining, it is desirable to dry the uranium salt. Separation can be done by filtration, decantation or centrifugation of the salt from the mother liquor. Drying can be done by spray drying or drum drying for example. Any entrained hydrogen fluoride will be removed with water of hydration in the drying stage.

The reaction between $UF_6$ and aqueous sulphuric acid yields, in a simplistic sense, a three phase system comprised of a solid uranyl sulphate-bisulphate complex, identified as $2UO_2(HSO_4)_2 \bullet UO_2SO_4 \bullet 8H_2O$, a four component liquid phase, of the form: $UO_2SO_4$—HF—$H_2O$—$H_2SO_4$, and a gaseous phase containing AHF. The reaction between $UF_6$ and aqueous sulphuric acid can be described by the following equations:

$$UF_6 + 2H_2O \rightarrow UO_2F_2 + 4HF$$

$$UO_2F_2 + H_2SO_4 \rightarrow UO_2SO_4 + 2HF$$

Thermal decomposition of the resultant uranyl sulphate and reformation of sulphuric acid can similarly be described by the equations:

$$3UO_2SO_4 \rightarrow U_3O_8 + 3SO_3 + \tfrac{1}{2}O_2$$

$$SO_3 + H_2O \rightleftharpoons H_2SO_4$$

These equations however ignore the reality that the solvent system is composed of two components, i.e. $H_2O$ and $H_2SO_4$, both of which may react with $UF_6$ in competing reactions, and that the isolatable uranyl sulphate-bisulphate complex is, based on known phase relationships, a complex cosolvated salt which can be represented in the form $UO_2SO_4 \bullet xH_2SO_4 \bullet yH_2O$, wherein x and y vary between 0 and 3, depending upon process parameters.

In principle the system is more complex still, since one is working with at a minimum a four component system of the form: $UO_2SO_4$—$HF$—$H_2O$—$H_2SO_4$ for which no data are available in the literature. In order to appreciate the complexity of the process chemistry one must consider that $UF_6$ may react with both $H_2O$ and $H_2SO_4$. If one ignores for the sake of simplicity the ionic nature of the solvent system and the resultant reactions, one can describe the probable chemistry of the reaction of $UF_6$ with $H_2O$ by the following series of equations:

$$UF_6 + H_2O \rightarrow UF_5OH + HF$$

$$UF_5OH \rightarrow UOF_4 + HF$$

$$UOF_4 + H_2O \rightarrow UOF_3OH + HF$$

$$UOF_3OH \rightarrow UO_2F_2 + HF$$

Further reaction of the uranyl fluoride, $UO_2F_2$, product is possible and may be represented by the equations:

$$UO_2F_2 + H_2O \rightleftharpoons UO_2FOH + HF$$

$$UO_2FOH \rightleftharpoons UO_3 + HF$$

$$UO_2FOH + H_2O \rightleftharpoons UO_2(OH)_2 + HF$$

$$UO_2(OH)_2 \rightleftharpoons UO_3 + H_2O$$

In an analogous sense one may write the following equations to describe the probable reaction of $UF_6$ with $H_2SO_4$:

$$UF_6 + H_2SO_4 \rightarrow UF_5HSO_4 + HF$$

$$UF_5HSO_4 \rightarrow UF_4SO_4 + HF$$

$$UF_4SO_4 + H_2SO_4 \rightarrow UF_3SO_4HSO_4 + HF$$

$$UF_3SO_4HSO_4 \rightarrow UF_2(SO_4)_2 + HF$$

$$UF_2(SO_4)_2 + H_2SO_4 \rightarrow UF(SO_4)_2HSO_4 + HF$$

$$UF(SO_4)_2HSO_4 \rightarrow U(SO_4)_3 + HF$$

While it may be proposed that the rate of reaction of $UF_6$ with $H_2O$ is much faster than that with $H_2SO_4$, and that the formation of $UO_2SO_4$ is due to the subsequent reaction of $UO_2F_2$ with $H_2SO_4$ as per the following equations:

$$UO_2F_2 + H_2SO_4 \rightarrow UO_2FHSO_4 + HF$$

$$UO_2FHSO_4 \rightarrow UO_2SO_4 + HF$$

and while it has been demonstrated that $UO_2F_2$ reacts with $H_2SO_4$ to yield $UO_2SO_4$ plus HF the supporting data does not rule out the rapid reaction of products, such as $U(SO_4)_3$ with $H_2O$ as per:

$$U(SO_4)_3 + H_2O \rightarrow UO(H_2SO_4)(SO_4)_2$$

$$UO(H_2SO_4)(SO_4)_2 \rightarrow UO(SO_4)_2 + H_2SO_4$$

$$UO(SO_4)_2 + H_2O \rightarrow UO_2(H_2SO_4)(SO_4)$$

$$UO_2(H_2SO_4)(SO_4) \rightleftharpoons UO_2(HSO_4)_2 \rightleftharpoons UO_2SO_4 + H_2SO_4$$

In a further embodiment of the invention one reacts $UF_6$ with oleum, i.e. $H_2SO_4$ containing excess $SO_3$. In this case there is no significant amount of $H_2O$ initially present in the system and thus it is the aforementioned reactions of $UF_6$ and $H_2SO_4$ which predominate. In this regard we note that the reaction of $UF_6$ and anhydrous $SO_3$ has been described by Bougon, et. al. (*Inorg. Chem.* 16(9) 2252–2257, 1977 and *Inorg. Chem.* 17(7) 1858–1861, 1978). This reaction yields the uranium (V) compounds, $UF_2(SO_3F)_3$, $UF_3(SO_3F)_2$, $UF(SO_3F)_4$, and $UO(SO_3F)_3$, depending upon conditions. None of these compounds is, however, observed during the reaction of $UF_6$ with oleum. In the case of oleum, the chemistry is essentially that previously described for the aqueous $H_2SO_4$ system but with the additional reactions resulting from the interaction of HF with $SO_3$ to form fluorosulphuric acid, $HSO_3F$, as per:

$$HF + SO_3 \rightleftharpoons HSO_3F$$

This reaction is reversible with higher temperatures favoring the thermal decomposition to HF and $SO_3$. While it is known that HF may react with $H_2SO_4$ in an analogous reaction to yield $HSO_3F$ and $H_2O$, as per:

$$HF + H_2SO_4 \rightleftharpoons HSO_3F + H_2O$$

this reaction is of no significance relative to the current invention when one uses concentrated aqueous $H_2SO_4$ as described previously. Indeed $HSO_3F$ reacts violently with free water forming HF and $H_2SO_4$. The uranium salt isolated from the reaction of $UF_6$ with oleum is more complex than that with aqueous $H_2SO_4$ due to the formation of uranyl fluorosulphates, in addition to the more common uranyl sulphate-bisulphate complex. For example one may write the equations for the reaction of the intermediate uranyl fluoride with fluorosulphuric acid as per:

$$UO_2F_2 + HSO_3F \rightarrow UO_2FSO_3F + HF$$

$$UO_2FSO_3F \rightarrow UO_2(SO_3F)_2 + HF$$

$$UO_2FSO_3F + H_2SO_4 \rightarrow UO_2(SO_3F)(HSO_4) + HF$$

In a similar manner the uranium oxyfluoride precursor, $UOF_4$, reacts with $HSO_3F$ as per the following:

$$UOF_4+HSO_3F \rightarrow UOF_3(SO_3F)+HF$$

$$UOF_3(SO_3F)+HSO_3F \rightarrow UOF_2(SO_3F)_2+HF$$

$$UOF_2(SO_3F)_2+H_2O \rightarrow UO_2F(HSO_3F)(SO_3F)+HF$$

$$UO_2F(HSO_3F)(SO_3F) \rightarrow UO_2(SO_3F)_2+HF$$

$$UOF_2(SO_3F)_2+H_2SO_4 \rightarrow UOF(HSO_4)(SO_3F)_2+HF$$

$$UOF(HSO_4)(SO_3F)_2+H_2SO_4 \rightarrow UO(HSO_4)_2(SO_3F)_2+HF$$

$$UO(HSO_4)_2(SO_3F)_2+H_2O \rightarrow UO_2(HSO_4)_2(HSO_3F)_2$$

$$UO(HSO_4)_2(SO_3F)_2+H_2O \rightarrow UO_2(H_2SO_4)(HSO_4)(SO_3F)(HSO_3F)$$

$$UO(HSO_4)_2(SO_3F)_2+H_2O \rightarrow UO_2(H_2SO_4)_2(SO_3F)_2$$

$$UO_2(HSO_4)_2(HSO_3F)_2 \rightarrow UO_2(HSO_4)_2+2HSO_3F$$

$$UO_2(H_2SO_4)(HSO_4)(SO_3F)(HSO_3F) \rightarrow UO_2(HSO_4)(SO_3F)+H_2SO_4+HSO_3F$$

$$UO_2(H_2SO_4)_2(SO_3F)_2 \rightarrow UO_2(SO_3F)_2+2H_2SO_4$$

The formation of uranyl compounds in a system, i.e. oleum, which does not contain significant amounts of free $H_2O$ is due to the rapid reaction: $SO_3+H_2O \rightleftharpoons H_2SO_4$ and reflects the fact that $SO_3$ and $H_2O$ are in equilibrium with $H_2SO_4$ and that, despite an excess of $SO_3$, the $UF_6$ and/or the aforementioned complex fluorouranium sulphates from the direct reaction of $UF_6$ with anhydrous $H_2SO_4$ effectively competes with $SO_3$ for $H_2O$ and yields in the first instant $UOF_4$ and then $UO_2F_2$, both of which have been conclusively identified as reaction intermediates by X-ray diffraction, Raman spectrometry, and mass spectrometry.

In the case of the reaction of $UF_6$ with oleum, anhydrous hydrogen fluoride is liberated from the liquid phase and may be further recovered by distillation with thermal decomposition of any fluorosulphuric acid to $SO_3$ and HF. The recovered uranium salt, though a mixture of sulphates, bisulphates, and fluorosulphates, may be thermally decomposed as in the case of the aforementioned uranyl sulphate-bisulphate complex in either an oxygen rich or hydrogen rich environment to recover $U_3O_8$ or $UO_2$, respectively, plus the contained HF and $H_2SO_4$ values. From a process control stand-point it is desirable to maintain an excess of $H_2SO_4$ relative to $UF_6$ in order to minimize the formation of uranium oxyfluorides and fluorouranium sulphate-bisulphate intermediates.

In a further embodiment of the invention $UF_6$ is reacted with aqueous $H_3PO_4$. In a simplistic sense one may once again attribute the initial chemistry to the reaction of $UF_6$ and $H_2O$ to yield HF and $UO_2F_2$; the latter of which undergoes a further reaction with $H_3PO_4$, as per:

$$UO_2F_2+H_3PO_4 \rightarrow UO_2HPO_4+2HF$$

or more correctly, via the two step process:

$$UO_2F_2+H_3PO_4 \rightarrow UO_2F(H_2PO_4)+HF$$

$$UO_2F(H_2PO_4) \rightarrow UO_2HPO_4+HF$$

followed by solvation of the monohydrogen phosphate to the dihydrogen phosphate depending upon reaction conditions, as per:

$$UO_2HPO_4+H_3PO_4 \rightarrow UO_2(H_2PO_4)_2,$$

but as in the aforementioned case of the reaction of $UF_6$ with $H_2SO_4$ and oleums it is demonstrated that the chemistry is more complex. While the reaction of $UF_6$ with $H_3PO_4$ has not been reported in the literature, a number of authors have reported on the synthesis and physicochemical properties of uranyl phosphates. In particular, we note the studies of Schreyer and Baes, and particularly their work reported in *J. Am. Chem. Soc.* 76, 354–357, (1954), and *J. Phys. Chem* 59, 1179–1181 (1955). While three uranyl phosphates and their hydrates are known, vis. $(UO_2)_2(PO_4)_3$, $UO_2HPO_4$, and $UO_2(H_2PO_4)_2$, only the latter species is isolatable from concentrated phosphoric acid media. Under the conditions of this embodiment of our process we have identified the isolatable uranyl phosphate as uranyl dihydrogen orthophosphate trihydrate: $UO_2(H_2PO_4)_2(H_2O)_3$. Its formation may be accounted for in a manner analogous to the aforementioned reaction of $UF_6$ with $H_2SO_4$ by writing the following equations to describe the reaction of $UF_6$ with $H_3PO_4$:

$$UF_6+H_3PO_4 \rightarrow UF_5H_2PO_4+HF$$

$$UF_5H_2PO_4 \rightarrow UF_4HPO_4+HF$$

$$UF_4HPO_4+H_3PO_4 \rightarrow UF_3(HPO_4)(H_2PO_4)+HF$$

$$UF_3(HPO_4)(H_2PO_4) \rightarrow UF_2(HPO_4)_2+HF$$

$$UF_2(HPO_4)_2+H_3PO_4 \rightarrow UF(HPO_4)_2(H_2PO_4)+HF$$

$$UF(HPO_4)_2(H_2PO_4) \rightarrow U(HPO_4)_3+HF$$

Reaction of the fluorouranium mono- and dihydrogen phosphates with $H_2O$ then yields the recovered uranyl compounds, as, for example, per the following:

$$U(HPO_4)_3+H_2O \rightarrow UO(HPO_4)_2(H_3PO_4) \rightleftharpoons UO(HPO_4)(H_2PO_4)_2$$

$$UO(HPO_4)_2(H_3PO_4) \rightarrow UO(HPO_4)_2+H_3PO_4$$

$$UO(HPO_4)_2+H_2O \rightarrow UO_2(HPO_4)(H_3PO_4) \rightleftharpoons UO_2(H_2PO_4)_2$$

$$UO_2(HPO_4)(H_3PO_4) \rightarrow UO_2HPO_4+H_3PO_4$$

The actual reaction sequence in this case is more complex due to the reversible reaction of HF with $H_3PO_4$ to yield fluorophosphoric acid, $H_2PO_3F$, and difluorophosphoric acid, $HPO_2F_2$, as per:

$$H_3PO_4+HF \rightleftharpoons H_2PO_3F+H_2O$$

$$H_2PO_3F+H_3PO_4 \rightleftharpoons HPO_2F_2+H_2O$$

Both of these acids react with $UF_6$ forming the corresponding fluorouranium fluorophosphates, as, for example, per:

$$UF_6+H_2PO_3F \rightarrow UF_5HPO_3F+HF$$

$$UF_5HPO_3F \rightarrow UF_4PO_3F+HF$$

$$UF_4PO_3F+H_2PO_3F \rightarrow UF_4(HPO_3F)_2$$

$$UF_4(HPO_3F)_2 \rightarrow UF_3(HPO_3F)PO_3F+HF$$

$$UF_3(HPO_3F)PO_3F \rightarrow UF_2(PO_3F)_2+HF$$

The reaction of $UF_6$ with $H_3PO_4$ is quantitative and occurs rapidly at moderate and subambient temperatures, say −80°

C. to 100° C. While recovery of anhydrous hydrogen fluoride is achievable, the system is more complex than the case with sulphuric acid, oleum, or fluorosulphuric acid, due to the reversible reaction of HF and $H_3PO_4$ to form the fluorophosphoric acids noted above. These acids can be decomposed with the regeneration of anhydrous HF but only under strictly controlled conditions. The thermal decomposition of the uranyl dihydrogen orthophosphate trihydrate is also less advantageous than that of the uranyl sulphate-bisulphate complex. Instead of a clean decomposition to a simple uranium oxide with recovery of the initial acid values, one observes, as per Kamo and Ohashi in *Bull. Soc. Chem. Jpn.* 43(1), 84–89, (1970), a multi-stage process wherein water is eliminated and polymerization to di- and triphosphates occurs at temperatures up to about 300° C. Between 300° C. and about 840° C. further polymerization to long chain metaphosphates takes place. The metaphosphate, $[UO_2(PO_3)_2]_n$ melts at about 900° C. along with a partial reduction of U(VI) to U(IV); leading to the formation of the uranium (IV) diphosphate, $UP_2O_7$, which is complete at about 1200° C. This process, therefore, while allowing for the recovery of anhydrous hydrogen fluoride and the formation of stable uranium species potentially suitable for disposal does not readily lend itself to the synthesis of a uranium compound suitable for use in nuclear fuel, nor to the recovery of acid values, and as such is less advantageous than the preferred embodiment using sulphuric acid.

When the strong mineral acid is sulphuric acid, oleum or fluorosulphuric acid the uranium salt is in the form of an amorphous or crystalline solid or a viscous oily liquid that may be converted to a solid or treated as is. The salt is separated from the mother liquor, in accordance with preferred embodiments of the invention, dried and subjected to calcining. The mother liquor from which the salt has been recovered can then be returned to the process for further reaction with uranium fluoride.

When the strong mineral acid is sulphuric acid, oleum or fluorosulphuric acid the uranium salt formed will be a sulphate-bisulphate complex or a fluorosulphate. Calcination of this salt will yield $SO_3$, $SO_2$ and $O_2$ (and in the case of the fluorosulphate, $SO_2F$ and the like). These are collected and reacted in known manner to form $H_2SO_4$, and in the case of the fluorosulphate, HF and $HSO_3F$, which can then be used for further reaction with a uranium fluoride. Suitable methods include the well known lead chamber process and contact process for producing sulphuric acid. Another possibility is to use a process, based on nitrosyl sulphuric acid chemistry, in accordance with the following equations:

$$SO_2+H_2O+N_2O_3 \rightarrow H_2SO_4+2NO$$

$$2NO+\tfrac{1}{2}O_2 \rightarrow N_2O_3$$

$$2NOHSO_4+SO_2+5H_2O \rightarrow 3H_2SO_4+2NO$$

Thus, when applied to $UF_6$, the present invention provides an advantageous and economical process for obtaining the valuable fluorine, in the form of anhydrous and substantially pure hydrogen fluoride. By means of this invention it has been possible to recover substantially all of the fluorine present; from one mole of $UF_6$ applicant has succeeded in obtaining six moles of HF. The only reactant required for this purpose is concentrated sulphuric acid. The sulphuric acid is readily recovered from the uranyl sulphate precipitate, as described above. Hence, apart from small make-up quantities, extra sulphuric acid is not required once the reaction has been established. The only consumable reagent in the process is water. $UF_6$ can be converted to $U_3O_8$ which, being the most thermodynamically stable oxide of uranium, is the compound of choice for storing uranium; if radioactive material derived from the fuel conversion and enrichment processes must be stored, it is preferred to store it as $U_3O_8$ rather than $UF_6$. Furthermore, anhydrous, highly pure hydrogen fluoride is immediately usable in the preparation of $UF_6$. The process of the invention produces no byproducts, so it is environmentally friendly.

It is possible to subject the obtained uranyl sulphate-bisulphate complex to treatments other than thermal decomposition in an oxidative environment. For instance, it can be reduced to uranium dioxide by reaction with hydrogen, say 5–75 mol % hydrogen in nitrogen. This reaction also yields sulfur dioxide which can then be oxidized to sulphur trioxide and reacted with water to recover the sulphuric acid used. The invention is illustrated in the following equations:

$$UO_2SO_4+H_2 \rightarrow UO_2+SO_2+2H_2O$$

$$2SO_2+O_2+2H_2 \rightarrow H_2SO_4$$

As the sulphuric acid used in the initial reaction is recovered, the invention provides an economical route from $UF_6$ to uranium dioxide. When applied to natural or enriched uranium, this embodiment provides a valuable route to uranium dioxide to be used in fuel pellets for nuclear reactors. The process of the invention can of course be applied to compounds containing natural uranium, compounds containing uranium enriched in $^{235}U$ and compounds depleted in $^{235}U$.

The invention has been discussed above with particular reference to $UF_6$, $UF_4$, and $UO_2F_2$ but it is known that many fluorine containing compounds in which the uranium is in the tetravalent or higher valency state, including $UF_5$, $U_2F_9$, and $U_4F_{17}$, undergo disproportionation and hydrolysis to form $UF_4$ and $UO_2F_2$, so it is clear that the process of the invention can be applied to these compounds.

The invention is further illustrated in the following examples:

EXAMPLE 1

Many experiments reacting $UF_6$ with $H_2SO_4$ were carried out in accordance with the following procedure. The $UF_6$, about 10 g was condensed in a Teflon tube in a liquid nitrogen bath at −196° C. and then weighed. The $H_2SO_4$, typically about 14 mL, of a predetermined strength from about 50 wt % to 100 wt %, but more usually in the range of 75 wt % to 85 wt % was then added by vacuum transfer and frozen out on top of the $UF_6$. The reactor was then allowed to warm up slowly to ambient temperature, or in some cases was heated to about 100° C. Reaction occurred immediately and quite vigorously in each case on the removal of the liquid nitrogen bath. An orange band was normally observed to form at the interface of the $UF_6$ and $H_2SO_4$, preceding the formation of a bright yellow precipitate and increased gas pressure. Gas samples were collected and analyzed by Fourier Transform infrared spectroscopy and electron impact mass spectrometry. The major component of the collected gas samples was hydrogen fluoride. Minor components included oxygen and nitrogen from air dissolved in the acid, and $SiF_4$ formed by the reaction of HF with glass components within the mass spectrometer. No $UF_6$ was observed in the off gases. The water content was analyzed mass spectrometrically based on the ion yields for DF$^+$, H$_2$O$^+$, and H$_3$O$^+$. Moisture levels were observed to vary from about 65 ppM, dependent upon experimental conditions and thus clearly fall within the nominal industrial limits for anhydrous HF ($\leq$500 ppM H$_2$O). The insoluble uranyl sulphate-bisulphate complex was recovered as either a viscous yellow orange oil, a light yellow precipitate, or a bright yellow crystalline solid depending upon experiemental conditions. Removal of entrained H$_2$SO$_4$, from the complex, up to about 30 wt %, was often difficult, whereas entrained HF rarely exceeded 0.3 wt %.

Analysis of the mother liquor after solid-liquid separation, typically filtration through Teflon filters, or liquid-liquid separation in the case of the oils showed that it was a very concentrated sulphuric acid solution; typically of the same order of magnitude as the initial acid, and saturated in both uranyl sulphate/bisulphate and hydrogen fluoride. The solubility of uranyl sulphate/bisulphate in the sulphuric acid-hydrofluoric acid matrix was found to be a function of sulphuric acid concentration and temperature, in a manner consistent with reports in the literature. In a typical experiment about 92 wt % of the HF reported directly to the gas phase at about 25° C., the remainder remaining in solution with the sulphuric acid and soluble uranium. The soluble component was identified by fast atom bombardment mass spectrometry and Raman spectrometry to be uranyl bisulphate. The insoluble component was identified via X-ray diffraction in the case of crystalline material, and by thermal analysis (TGA, DTA, and DSC), plus Raman and infrared spectroscopy and fast atom bombardment mass spectrometry to be the uranyl sulphate-bisulphate hydrate, first characterized by Cordfunke from the UO$_3$—H$_2$SO$_4$—H$_2$O system, as 2UO$_2$(HSO$_4$)$_2$●UO$_2$SO$_4$●8H$_2$O.

The thermal decomposition of the acquired uranyl sulphate-bisulphate salt was carried out on all samples and shown to follow the behaviour described by Cordfunke. The resultant U$_3$O$_8$ in the use of an oxidative environment and UO$_2$ in the case of a reductive environment was characterized by standard technique, including but not limited to X-ray diffraction, infrared spectroscopic and gas and elemental analysis.

Control experiments with a 10 to 100-fold excess of UF$_6$, demonstrated that reaction intermediates include the known compounds, UOF$_4$ and UO$_2$F2, plus a number of previously unreported fluorouranium sulphates. The quantitative formation of the uranyl sulphate-bisulphate complex is however achieved simply by adding additional acid.

EXAMPLE 2

In a series of experiments, 50 to 100 g quantities of anhydrous uranyl fluoride, UO$_2$F$_2$, or its 1.5 hydrate, were reacted with a 2 to 10-fold stoichiometric excess of 75 wt % to 96 wt % sulphuric acid in a Teflon ractor, as in example #1. As in the case of UF$_6$, the reaction occurred essentially instantaneously at subambient temperatures and quite vigorously at ambient or elevated temperatures with the liberation of hydrogen fluoride. Characterization of the reaction products demonstrated that the recoverable uranyl sulphate complex was the aforementioned species, 2UO$_2$(HSO$_4$)$_2$●UO$_2$SO$_4$●8H$_2$O.

EXAMPLE 3

In a series of experiments 5 to 15 g quantities of uranium tetrafluoride, UF$_4$ and 2 to 10-fold excess of 75 wt % to 96 wt % sulphuric acid were reacted in Teflon reactors. No appreciable reaction occurred at ambient temperature even after 15 hours. Reaction occurred at temperatures in excess of 50° C., and became vigorous at approximately 80° C. with the evolution of anhydrous hydrogen fluoride. A viscous green oil, and/or crystalline solid was recovered and indentified as U(SO$_4$)$_2$ on the basis of thermal analysis, infrared and Raman spectroscopy, fast atom bombardment mass spectrometry, and X-ray diffraction. Thermal decomposition of this material in an oxygen rich environment gave U$_3$O8 as identified by elemental analysis and X-ray diffraction.

EXAMPLE 4

In a series of experiments UF$_6$ was reacted with oleum carried out as per example #1 for aqueous H$_2$SO$_4$. The UF$_6$, about 10 g, was condensed in a Teflon tube at -196° C. and then weighed. Quantities of oleum, typically about 14 mL, with about 20 wt % excess SO$_3$ were then added by vacuum transfer and frozen out on top of the UF$_6$. The reactor was then allowed to warm up slowly to ambient temperature, or in some cases was heated to about 100° C. Reaction occurred immediately and quite vigorously as in the case of aqueous H$_2$SO$_4$ with the removal of the liquid nitrogen bath. An orange band was observed to form at the interface of the UF$_6$ and H$_2$SO$_4$/SO$_3$ preceding the formation of a bright yellow precipiate and increased gas pressure. Gas samples were collected and analyzed by Fourier Transform infrared spectroscopy and electron impact mass spectrometry. The major component of the collected gas samples was hydrogen fluoride. Minor components included oxygen and nitrogen from air dissolved in the acid, and SiF$_4$ formed by the reaction of HF with glass components within the mass spectrometer and SO$_3$. No UF$_6$ was observed in the off gases. Moisture levels were observed to vary from about 85 ppM to 150 ppM, dependent upon experimental conditions. The insoluble uranyl sulphate-bisulphate complex was recovered as either a viscous yellow orange oil, a light yellow precipitate, or a bright yellow crystalline solid depending upon experiemental conditions.

Analysis of the mother liquor after solid-liquid separation, typically filtration through Teflon filters, or liquid-liquid separation in the case of the oils showed that it was still a very concentrate oleum solution; tuypically of the same order of magnitude as the initial acid, and saturated in uranyl sulphate/bisulphate, fluorosulphuric acid and hydrogen fluoride. The solubility of uranyl sulphate/bisulphate/ fluorosulphate complex in the H$_2$SO$_4$—HF—HSO$_3$F matrix was found to be very temperature dependent in a manner consistent with the thermal stability of fluorosulphuric acid. In typical experiments about 65 wt % of the HF reported directly to the gas phase at about 25° C., the remainder remaining in solution, either as free HF or HSO$_3$F. The soluble uranium component was identified by fast atom bombardment mass spectrometry and Raman spectrometry to be a complex mixture of uranyl bisulphate and uranyl fluorosulphate. The insoluble component was identified via X-ray diffraction in the case of crystalline material, and by thermal analysis (TGA, DTA, and DSC), plus Raman and infrared spectroscopy and fast atom bombardment mass spectrometry to be a mixture of the normal uranyl sulphate-bisulphate hydrate 2UO$_2$(HSO$_4$)$_2$●UO$_2$SO$_4$●8H$_2$O and a mixed bisulphate-fluorosulphate complex.

EXAMPLE 5

In a series of experiments UF$_6$ and H$_3$PO$_4$ were reacted, typically as per example #1 in a Teflon tube reactor. The reaction between the UF$_6$ and the H$_3$PO$_4$ was indicated by a change in the colour of the components from white to yellow, temporary formation of a precipitate that disappeared as the temperature reached about 80° C. to 85° C., and a rise in pressure due to the evolution of anhydrous hydrogen fluoride. A rise followed by a decline in pressure was consistent over all of the experiments involving $H_3PO_4$. The decrease in pressure corresponded to the slower secondary reaction between $H_3PO_4$ and the HF that was produced.

The gas that was produced was analyzed by electron impact mass spectrometry. The analysis showed that the gas was mainly anhydrous HF with moisture levels in the range of 75 ppM to 165 ppM range. The recoverable uranyl component was identified by the aforementioned techniques, to be the known uranyl dihydrogen phosphate trihydrate, along with lesser amounts of the fluorophosphate and difluorophosphates.

What is claimed is:

1. A process for producing hydrogen fluoride, which process comprises (i) reacting a uranium fluoride compound with a strong mineral acid to form a reaction mixture comprising hydrogen fluoride and a uranium salt of the mineral acid and (ii) recovering gaseous hydrogen fluoride from the reaction mixture.

2. A process according to claim 1 wherein the strong mineral acid is selected from the group consisting of sulphuric acid, oleum, fluorosulphuric acid, orthophosphoric acid, fluorophosphoric acid and difluorophosphoric acid and there is recovered hydrogen fluoride containing less than 500 ppm of water.

3. A process according to claim 2 wherein the uranium in the uranium fluoride compound is in the tetravalent or higher valency state.

4. A process according to claim 1 wherein the reaction is carried out at a temperature in the range from ambient to 200° C.

5. A process according to claim 1 further comprising recovering uranium salt from the reaction mixture to form a mother liquor and then recycling the mother liquor for further reaction with a uranium fluoride compound.

6. A process according to claim 2 wherein the uranium fluoride compound is $UF_6$ and the strong mineral acid is aqueous sulphuric acid of at least 50% concentration, oleum or fluorosulphuric acid.

7. A process according to claim 4 wherein (ii) comprises reacting aqueous sulfuric acid having a concentration in the range from 75% to 85% with $UF_6$ at a temperature in the range from about 80° to 100° C.

8. A process according to claim 7 wherein a uranium sulphate salt is recovered from the reaction mixture and the salt is calcined in an oxidizing atmosphere to convert the uranium salt to $U_3O_8$.

9. A process according to claim 8 wherein the uranium sulphate salt is calcined at a temperature in the range of from 620° to 860° C.

10. A process according to claim 8 wherein the uranium sulphate salt is calcined at a temperature in the range of from 725° to 760° C.

11. A process according to claim 8 wherein $SO_3$, $SO_2$ and $O_2$ from the calcining step are converted to sulphuric acid and recycled for further reaction with $UF_6$.

12. A process according to claim 7 wherein a uranium sulphate salt is recovered from the reaction mixture and the salt is calcined in a reducing atmosphere to convert the uranium salt to $UO_2$.

13. A process according to claim 12 wherein the uranium sulphate salt is calcined at a temperature in the range of from 620° to 860° C.

14. A process according to claim 12 wherein the uranium sulphate salt is calcined at a temperature in the range of from 725° to 760° C.

15. A process according to claim 12 wherein the uranium salt is calcined in an atmosphere of dissociated ammonia.

16. A process according to claim 12 wherein $SO_3$, $SO_2$ and $O_2$ from the calcining step are converted to sulphuric acid and recycled for further reaction with $UF_6$.

17. A process for producing hydrogen fluoride, which process comprises (i) reacting $UF_6$ with aqueous sulfuric acid having a concentration in the range from 75% to 85% at a temperature in the range from ambient to 200° C. to form a reaction mixture comprising hydrogen fluoride and a uranium salt of sulfuric acid and (ii) recovering gaseous hydrogen fluoride from the reaction mixture.

18. A process according to claim 17 wherein the reaction is carried out at a temperature in the range from about 80° C. to 100° C.

19. A process according to claim 17 wherein the uranium sulphate salt is calcined at a temperature in the range of from 620° to 860° C.

20. A process according to claim 17 wherein the uranium sulphate salt is calcined at a temperature in the range of from 725° to 760° C.

21. A process according to claim 17 wherein $SO_3$, $SO_2$ and $O_2$ from the calcining step are converted to sulfuric acid and recycled for further reaction with $UF_6$.

22. A process according to claim 17 wherein a uranium sulphate salt is recovered from the reaction mixture and the salt is calcined in a reducing atmosphere to convert the uranium salt to $UO_2$.

23. A process according to claim 22 wherein the uranium sulphate salt is calcined at a temperature in the range of from 620° to 860° C.

24. A process according to claim 22 wherein the uranium sulphate salt is calcined at a temperature in the range of from 725° to 760° C.

25. A process according to claim 22 wherein the uranium salt is calcined in an atmosphere of dissociated ammonia.

26. A process according to claim 22 wherein $SO_3$, $SO_2$ and $O_2$ from the calcining step are converted to sulfuric acid and recycled for further reaction with $UF_6$.

27. A process according to claim 3 wherein the uranium fluoride compound is in a valency state higher than the tetravalent state.

28. A process according to claim 27 wherein the uranium fluoride compound is in the hexavalent state.

29. A process according to claim 2 wherein the uranium fluoride compound is $UF_6$ and the strong mineral acid is aqueous sulfuric acid of at least 50% concentration.

30. A process according to claim 2 wherein the uranium fluoride compound is $UF_6$ and the strong mineral acid is oleum.

31. A process according to claim 2 wherein the uranium fluoride compound is $UF_6$ and the strong mineral acid is fluorosulphuric acid.

32. A process according to claim 2 wherein the uranium fluoride compound is $UF_6$ and the strong mineral acid is orthophosphoric acid.

33. A process according to claim 2 wherein the uranium fluoride compound is $UF_6$ and the strong mineral acid is fluorophosphoric acid.

34. A process according to claim 2 wherein the uranium fluoride compound is $UF_6$ and the strong mineral acid is difluorophosphoric acid.

35. A process according to claim 1 wherein $UF_6$ is reacted with aqueous sulfuric acid whose concentration is in the range of from 75 to 85%.

36. A process according to claim 1 wherein $UF_6$ is reacted with sulfuric acid at a temperature in the range from about 80° to 100° C.

* * * * *